May 6, 1941.　　　　H. W. UHLRIG　　　　2,241,103
TOASTER
Filed Sept. 15, 1939　　　　2 Sheets-Sheet 1
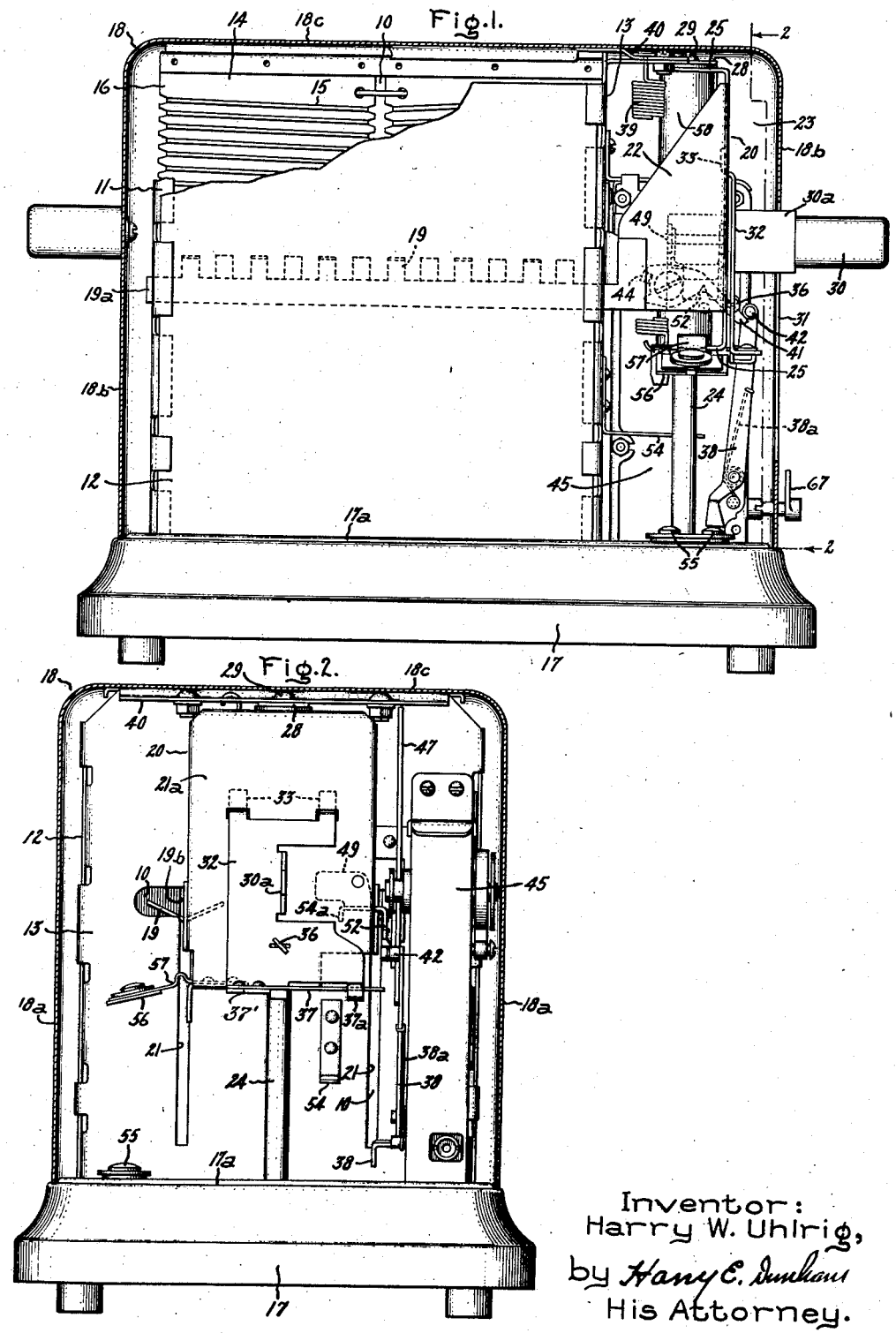
Inventor:
Harry W. Uhlrig,
by Harry C. Dunham
His Attorney.

May 6, 1941.　　　　H. W. UHLRIG　　　　2,241,103
TOASTER
Filed Sept. 15, 1939　　　　2 Sheets-Sheet 2
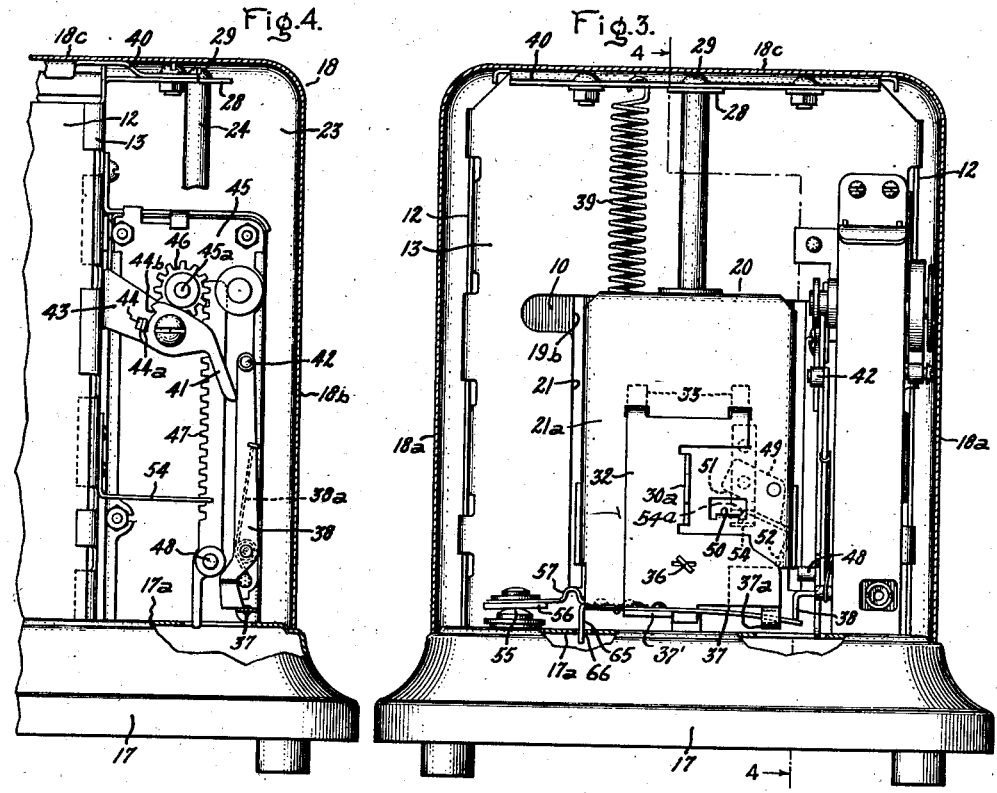
Inventor:
Harry W. Uhlrig,
by Harry E. Dunham
His Attorney.

Patented May 6, 1941

2,241,103

UNITED STATES PATENT OFFICE 2,241,103

TOASTER

Harry W. Uhlrig, Stratford, Conn., assignor to General Electric Company, a corporation of New York Application September 15, 1939, Serial No. 295,067

6 Claims. (Cl. 161—16)

This invention relates to toasters, more particularly to electrically heated bread toasters, and it has for its object the provision of an improved device of this character.

This invention is particularly applicable to automatic bread toasters wherein a timing mechanism is used to measure the toasting interval and cause the ejection of the toasted slice from the heating chamber at the proper time, and it contemplates an improved control in a toaster of this character.

This invention is particularly applicable to automatic toasters such as described and claimed in the copending application of Heber L. Newell, Serial No. 225,329, filed August 17, 1938, now Patent No. 2,217,450, and assigned to the same assignee as this application. As there described, the Newell toaster is provided with a slice holder which is movable between toasting and non-toasting positions. An operating member is provided for moving the slice holder to the toasting position. The operating member as it moves the slice holder to the toasting position engages a part of the timing mechanism to energize the timing mechanism so that it may function to time the toasting interval. When the bread tray reaches its toasting position the operating member and tray are released from the timing mechanism and are held in their toasting positions by means of suitable locking means. This invention contemplates the provision of an improved organization of parts which positively insures the release of the timing mechanism from the operating member and tray when these members have been moved to their toasting positions.

For a more complete understanding of this invention, reference should be had to the accompanying drawings in which Fig. 1 is a side elevation of an electric toaster embodying this invention, parts being shown in section and parts broken away so as to illustrate certain details of construction; Fig. 2 is a vertical sectional view taken through the line 2—2 of Fig. 1 and looking in the direction of the arrows; Fig. 3 is a vertical sectional view similar to Fig. 2 but illustrating certain parts of the toaster in different operative positions; Fig 4 is a fragmentary vertical sectional view taken through the line 4—4 of Fig. 3 and looking in the direction of the arrows; Fig. 5 is a fragmentary sectional view illustrating a portion of the mechanism shown in Fig. 3 but showing certain of the parts in different operative positions; Fig. 6 is a vertical sectional view illustrating a part of the control mechanism of the toaster of Figs. 1–5; and Fig. 7 is an enlarged fragmentary sectional view taken through a part of the mechanism shown in Fig. 6.

Referring to the drawings, this invention has been shown in one form as applied to an electric toaster of the automatic type in which the toasted slice is ejected at the end of a predetermined interval of time. This toaster comprises a pair of heating chambers 10 spaced apart cross-wise of the toaster, and which are defined by a rear wall 11, a pair of side walls 12, and a front wall 13. It will be understood that each heating chamber will be provided with a pair of spaced heating elements 14 for applying heat to the chambers. The heating elements 14 may be of any suitable type, but preferably will be provided with a resistance conductor 15 supported on a suitable vertically positioned sheet 16 of insulating material, such as mica.

The walls 11, 12 and 13 defining the heating chambers and the heating elements 14 are supported on a suitable base 17 which has a top wall 17a that defines the bottom of the heating chambers. The heating elements are surrounded by a casing 18, which as shown is of substantially rectangular form having side walls 18a, front and rear walls 18b, and a top wall 18c. This casing is supported by the base 17, as shown. It will be understood that the top wall 18a will be provided with a pair of elongated openings (not shown) through which bread slices may be inserted into the heating chambers 10.

Mounted in each heating chamber 10 is a suitable slice-holder 19. At their forward ends, the slice holders 19 project forwardly through the front wall 13 of the heating chambers where they are attached to a suitable supporting and actuating carriage 20. As shown, the front wall 13 is provided with spaced vertically arranged slots 21 which receive the parts of the slice-holders that project forwardly through the front wall 13. The rear ends of the slice-holders 19 are provided with extensions 19a that are received in vertical slots 19b provided for them in the rear wall 11 of the heating chambers.

The carriage 20, as shown, is provided with a vertical front plate 21a and with rearwardly extending flanges 22 at the sides of the front plate. The slice-holders 19, as shown more clearly in Fig. 1, are directly connected to these flanges.

It will be observed that the front wall 13 of the heating chambers is spaced to the rear of the front wall 18b of the casing 18 so as to define a chamber 23 that houses the carriage 20. Fixed within this chamber 23 is a vertically positioned rod 24 upon which the carriage 20 is slidably mounted. As shown, the carriage is provided at its upper and lower edges with rearwardly extending portions 25 which are rigidly attached to collars or bushings 26 (Fig. 6) that are slidably mounted on the rod 24. The rod 24 at its lower end is secured to the top wall 17a of the base 17 by means of a screw 27 (Fig. 6), and at its top is secured to a bracket 28 by means of a screw 29. The bracket 28 is supported by the walls of the heating chambers.

An actuating knob or handle 30 is connected to the carriage 20. This handle, as shown, is positioned in front of the front wall 18b, and is connected with the carriage by a tongue 30a which, as shown, projects through a vertical slot 31 provided for it in the front wall 18b. The tongue 30a connects the handle 30 directly with a plate-like bracket 32 which is mounted on the plate 20. The bracket 32 is provided at its upper end with tongues 33 which are pivoted to the front wall 21a of the plate 20. At its lower end the front plate 21a carries a stop member 36 for limiting the swinging movement of the bracket plate 32 away from the wall 21a. The bracket 32 carries an elongated resilient latch member 37. This latch member 37, as shown, is in the form of an elongated spring bar having one end, its lefthand end as viewed in Fig. 2, rigidly secured to a foot 37' extending out horizontally from the bracket 32. The opposite end of the resilient bar is free to move or flex. The movement of this opposite end, however, is limited by a stop member 37a through which the free end passes, as clearly shown in Figs. 2, 3 and 5. This free end of the latch member is adapted to be engaged by a suitable elongated pivoted catch member 38. The pivoted catch member 38 functions to engage the free end of the latch 37 to hold the carriage 20, and hence, the slice-holders 19 in their lower or toasting positions against the force of a suitable tension spring 39 which biases the carriage and the slice-holders to their upper or non-toasting positions. As shown in Fig. 1, the spring has its lower end secured to the carriage, and has its upper end anchored to a bracket 40 secured in the top of the chamber 23. The catch 38 is biased in a counter-clockwise direction to its locking position by means of a spring 38a, in which position it engages the spring latch 37, as shown in Figs. 3, 4 and 5.

A cam 41 is provided to operate the catch 38 to release the spring latch 37 and hence the carriage 20 and the slice-holders attached to it at the proper time. For this purpose, the upper end of the catch 38 is provided with an abutment 42 positioned to be engaged by the cam 41. The cam 41 is pivotally mounted on a bracket 43. The bracket carries a stop 44 which is adapted to be engaged by abutments 44a and 44b on the cam to limit its pivotal movement.

The cam 41 is operated to release the catch 38 from the resilient latch 37 at the end of the toasting interval by a suitable clockwork mechanism 45 mounted in the front chamber 23. The clockwork mechanism preferably will be of the spring-wound type and may have any suitable construction. It is provided with a winding shaft 45a upon which is mounted a spur gear 46 with which cooperates a winding rack 47. It will be understood that when the winding rack is moved downwardly, as viewed in the drawings, it rotates the winding shaft 45a to wind the clock spring, and that when the rack is released in its lower position, the clock will be free to unwind, and as it does so will elevate the rack to its initial upper position.

The rack 47 at its lower end carries an abutment 48 which when the rack is elevated by the unwinding action of the clock engages the cam 41 to rotate it in the counter-clockwise direction, as viewed in Fig. 4, to cause it to engage the abutment 42 on the catch 38 and thereby move the catch to release the spring latch 37.

The carriage 20 has an operable connection with the winding rack 47 so that when the knob 30 is depressed to move the slice-holders to their toasting positions, the rack likewise will be depressed to wind the clock. For this purpose, a suitable pawl or latch 49 is pivoted on the carriage. As shown more clearly in Figs. 3 and 5, the carriage is provided with a stop 50 which limits the counter-clockwise movement of the pawl 49, the stop 50 being positioned to engage an extension 51 provided on the pawl to thus limit its movement. The pawl at its righthand end, as viewed in Figs. 2, 3 and 5, has a downwardly extending forked tongue 52 which is positioned to engage the abutment 48 on the winding rack so that when the carriage is moved downwardly, the winding rack is also moved downwardly to wind the clock.

The latch or pawl 49 is disconnected from the winding rack when the carriage 20 arrives at its lower toasting position by means of a tongue-like spring abutment 54 fixed to the front wall 13 in the lower part of the chamber 23. The tongue 54 is positioned to engage a downwardly extending tongue 54a provided on the pawl 49, as clearly shown in Fig. 3, when the carriage reaches its lower toasting position to rotate the pawl in a clockwise direction so as to remove it from the abutment 48. When the carriage 20 has been moved to its lower toasting position, as shown in Figs. 4 and 5, so that the latch 37 is engaged by the catch 38, the spring abutment 54 engages the pawl 49 to release it from the abutment 48. To positively insure this release of the pawl 49 from the abutment 48, the resilient latch 37 and its stop members 37a provides for a slight upward movement of the carriage toward its non-toasting position, that is, it provides for a slight movement of the carriage from its lowest position of Fig. 5 to a slightly elevated lower position shown in Fig. 3. This relieves the pressure of the pawl 39 on the abutment 48 and permits the spring abutment 54 to positively move it away from the abutment 48. The spring latch 37 thereby obviates the possibility that the winding rack and carriage both will be locked in their lower positions.

The downward movement of the carriage 20 to its toasting position also serves to automatically close the energizing circuit of the heating elements 14 of the toaster. For this purpose, spaced-apart fixed contacts 55 are mounted in the top wall 17a of the base 17. These spaced fixed contacts are connected in the energizing circuit of the toasting heating elements 14. They are adapted to be bridged by a bridging contact 56 which is carried directly by the carriage by means of a resilient arm 57. It will be understood that the contact 56 will be electrically insulated from the arm 57 in any suitable manner, and likewise that the fixed contacts 56 will be electrically insulated from the base in any suitable manner. The bridging contact is so positioned that when the carriage is lowered to its toasting position it will bridge the spaced fixed contacts 55 and thereby complete the energizing circuit of the toaster. When the carriage is released at the end of the toasting operation it will open the toaster circuit at the same time that it moves the bread slices from the heating chamber.

A suitable dash pot is provided to cushion the upward movement of the carriage and slice-holders. As shown, more clearly in Fig. 6, the carriage 20 supports a suitable dash pot cylinder 58 between the collars 26 so that the cylinder 58 is moved upwardly and downwardly with the carriage as it moves upwardly and downwardly. Fixed upon the vertical shaft or rod 24 is a dash pot piston 59 comprising a cupped flexible washer 60, preferably formed of leather. The cupped washer has a base section 61 which is sandwiched between metallic washer-like members 62. These members 62 are held in their positions on opposite sides of the base 61 by ring-like clamping members 63 tightly fitted into grooves 64 provided for them in the rod 24. It will be understood that when the carriage moves downwardly, the cylinder 58 likewise moves downwardly, and that the washer 60 collapses to permit air in the upper part of the cylinder to move to the lower part of the cylinder. However, when the carriage is released and the cylinder moves upwardly, the air in the lower end of the cylinder in attempting to pass the cupped washer 61 will force it outwardly tightly against the inner walls of the cylinder 58. This air leaks out comparatively slowly from the clearance opening between the lower collar 26 and the rod 24, and thereby cushions the movement of the carriage and slice-holders. In addition, a vacuum is produced on the upper side of the piston which adds considerably to the dash pot action.

The carriage is provided with an extension 65 at its lower end which is received in an aperture 66 in the top wall 17a of the base to prevent twisting of the carriage when it is in its lower position.

In the operation of the toaster, it will be understood that the toaster will be connected to a suitable electrical supply source (not shown) by any suitable means such as a common twin supply conductor (not shown). When thus connected, the energizing circuit of the heating elements will not be completed because the switch contacts 55 will be open. The slices to be toasted will then be placed through the openings in the top 18c so as to be supported by the holders 19. The knob 30 will then be depressed. This operation will move the carriage 20 and the slice-holders 19 to their toasting positions, and also will wind the clockwork mechanism due to the fact that the latch 49 will engage with the abutment 48 of the winding rack 47 to move the winding rack downwardly. When the carriage 20 reaches its toasting position, the catch 38 will engage the spring latch 37 on the bracket 32 to hold the carriage down, and when the pressure of the hand of the operator on the knob 30 is released, the spring abutment 54 will operate to rotate the pawl 49 as previously described to disengage the abutment 48 on the winding rack. During this action, the spring latch 37 permits a slight upward movement of the carriage 20 from its position of Fig. 5 to the position of Fig. 3 to release the pressure of the pawl 49 on the abutment 48, thereby insuring the release of the winding rack from the carriage 20. The clockwork mechanism thereupon will elevate the rack and when the rack reaches its upper position, its abutment 48 will engage the cam 41 to move it to cause the catch 38 to disengage the carriage, whereupon the carriage is moved upwardly to its non-toasting position by the spring 39. As it thus moves upwardly the latch 49 pivots slightly in the clockwise direction so that its end 52 can move upwardly above the abutment 48 to position itself for the next toasting operation. It will be understood that the dash pot construction will cushion the upward movement of the carriage and the slice-holders.

The toaster is provided with a suitable control knob 67 for governing the basic speed or time setting of the clockwork mechanism, and thereby the toasting interval.

In the event that the attendant wishes to release the carriage 20 and the slice-holders 19 from the catch 38 before the timing mechanism has operated to release the catch 38, the knob 30 is grasped and moved upwardly slightly so as to pivot the bracket 32 about its upper edge to move the spring latch 37 outwardly from the catch 38. This, of course, releases the bracket and carriage and permits them to move upwardly to their non-toasting positions. It will be understood that the stop 36 will be so positioned that the bracket is permitted to move outwardly sufficiently far from the carriage to release the latch 37.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An automatic toaster comprising a heating chamber, a slice-holder in said heating chamber mounted for movement from a non-toasting position to a toasting position, means biasing said holder to said non-toasting position, a member connected to said holder to move it to said toasting position, a timing mechanism, a part of said member engaging a part of said timing mechanism to energize it when said member is operated to move said slice-holder to its toasting position, a resilient latch on said member, a catch engaging said latch to hold said slice-holder in its toasting position, means engaging said part of said member to release said timing mechanism as said member reaches its toasting position, the resilient latch permitting a slight movement of said member from its toasting position towards its non-toasting position after being engaged by said engaging means to insure release of said part of said member from said timing mechanism, and said timing mechanism operating to release said catch to free said member and said slice-holder at the end of a toasting interval.

2. An automatic toaster comprising a heating chamber, a slice-holder in said chamber movable between toasting and non-toasting positions, means biasing said holder to said non-toasting position, an actuating member connected to said holder operable when moved from one to another position to move said slice-holder to said toasting position, a clockwork mechanism having a winding member, a pawl on said actuating member engaging said winding member to operate it to energize the clockwork mechanism when said actuating member moves said slice-holder to said toasting position, resilient latching means on said actuating member, a catch engaging said latching means to hold said slice-holder in said toasting position against the force of said biasing means, means engaging said pawl to move it to disengage said winding member when said actuating member reaches said other position, the resilient latching means providing for a slight movement of said actuating member toward its non-toasting position to relieve the pressure of said pawl on said winding member and thereby insure the disengagement of said pawl from said winding member, and said timing mechanism operating to move said catch from said resilient latching means at the end of a toasting time interval.

3. A toaster comprising a heating chamber, a slice-holder in said chamber, a vertically movable carriage attached to said holder for moving the holder between a toasting position in said heating chamber and an upper non-toasting position, means biasing the holder and carriage to their non-toasting positions, a clockwork mechanism, means on the carriage engaging the winding member of the clockwork mechanism to wind the clock when the carriage is moved to lower the slice-holder to its toasting position, means operating to release said engaging means from said winding member when said holder reaches the lower position to free the clockwork mechanism to unwind, a resilient latch on said carriage, a catch engaging said latch to hold said carriage in its lower position while said clockwork mechanism is unwinding and associated with said clockwork mechanism to be released thereby from said latch at the end of a predetermined interval to free said carriage and the slice-holder attached to it, said resilient latch permitting a slight upward movement of said carriage after it is engaged by said catch so as to relieve the pressure of said engaging means on said winding member.

4. A toaster comprising a heating chamber, a slice-holder in said chamber, a vertically movable carriage attached to said holder for moving the holder between a toasting position in said heating chamber and an upper non-toasting position, means biasing the holder and carriage to their non-toasting positions, a clockwork mechanism, a pivoted latch on said carriage normally in a position to engage the winding member of said clockwork mechanism so as to wind the mechanism when the carriage is moved to lower the slice-holder to its toasting position, means engaging said latch to release the clockwork mechanism substantially when the holder reaches the toasting position, a resilient spring bar having one end secured to said carriage, and having its opposite end free to flex, means limiting the freedom of movement of said opposite end, and a catch engaging said free end to hold the slice-holder in its toasting position and associated with the clockwork mechanism so that the latter operates it to release the carriage at the end of a predetermined interval of time.

5. A toaster comprising a heating chamber, a slice-holder in said chamber, a vertically movable carriage attached to said holder for moving the holder between a toasting position in said heating chamber and an upper non-toasting position, means biasing the holder and carriage to their non-toasting positions, a clockwork mechanism, a pivoted latch on said carriage normally in a position to engage the winding member of said clockwork mechanism so as to wind the mechanism when the carriage is moved to lower the slice-holder to its toasting position, a spring abutment positioned to engage said latch to release the clockwork mechanism substantially when the holder reaches the toasting position, a resilient latch mounted on said carriage, and a catch engaging said latch to hold the slice-holder in its toasting position and associated with said clockwork mechanism so that it releases the carriage at the end of a predetermined interval of time, said resilient latch providing for a slight movement of said carriage toward its non-toasting position so as to lessen the engaging pressure of said pivoted latch on said winding member and thereby insure the release of said pivoted latch from said clockwork mechanism.

6. A toaster comprising a heating chamber, a slice-holder in said heating chamber, a carriage supporting said slice-holder mounted for vertical movement from an upper non-toasting position to a lower toasting position, a handle for said carriage to move it to its lower toasting position, means mounting said handle on said carriage for limited pivotal movement, a resilient latch carried by said handle, a catch engaging said latch to hold the carriage in its lower toasting position, a timing mechanism arranged to release said catch automatically at the end of a predetermined interval of time, a pawl carried by said carriage arranged to engage the winding member of said clockwork mechanism when the carriage is moved to its lower position to wind the clockwork mechanism, a resilient abutment for engaging said pawl to release it from said clockwork mechanism when the carriage is moved to its lower toasting position, said resilient latch providing for a slight upward movement of said carriage after it is engaged by said catch to insure the release of said pawl from said clockwork mechanism, and the handle when moved within the limits of its pivotal movement with reference to said carriage operating the spring latch to disengage the catch and thereby release the carriage.

HARRY W. UHLRIG.